United States Patent [19]
Kreyenberg

[11] Patent Number: 4,772,400
[45] Date of Patent: Sep. 20, 1988

[54] METHOD AND FACILITY FOR REMOVING SLUDGE FROM WATER

[76] Inventor: Heiner Kreyenberg, Waldseestrasse 31, 4030 Ratingen 4, Fed. Rep. of Germany

[21] Appl. No.: 60,746

[22] Filed: Jun. 10, 1987

[30] Foreign Application Priority Data

Jun. 20, 1986 [DE] Fed. Rep. of Germany ....... 3620700

[51] Int. Cl.$^4$ .................... B01D 17/00; B01D 17/038; B01D 21/26; B01D 33/00
[52] U.S. Cl. .................................. 210/781; 210/788; 210/805; 210/806
[58] Field of Search .................... 209/3, 10, 162; 210/294, 295, 297, 360.1, 512.1, 767, 780, 781, 787, 788, 805, 806; 175/67, 65, 66, 70, 38, 207, 209, 215, 217

[56] References Cited

U.S. PATENT DOCUMENTS

| | | |
|---|---|---|
| 2,538,285 | 1/1951 | Swayze . |
| 3,737,037 | 6/1973 | Bone ..................................... 210/734 |
| 4,133,747 | 1/1979 | Visman ................................. 209/10 |
| 4,537,599 | 8/1985 | Greenwald et al. ..................... 209/3 |
| 4,624,327 | 11/1986 | Reichmann ............................ 175/67 |

FOREIGN PATENT DOCUMENTS

2617372 11/1976 Fed. Rep. of Germany .
3517931 11/1986 Fed. Rep. of Germany .

OTHER PUBLICATIONS

Ports and Dredging, No. 121, 1985 (Verplaatsbare goudwasinstallatie), Netherlands (pp. 14–17).
Aufbereitungs-Technik, vol. 23, No. 4, of Apr. 1982, (pp. 169–172) M. Bräuer.
Aufbereitungs-Technik, vol. 27, No. 7, of Jul. 1986, (pp. 396–402) W. Hasse and J. Hinterkeuser.
Water Pollution Control Federation, Wastewater Treatment Plant Design, 1977, (pp. 160, 183 & 340).
Industrie-Abwässer, F. Meinck et al., 4th Edition, 1968, (pp. 81, 82).

*Primary Examiner*—Frank Sever
*Attorney, Agent, or Firm*—Becker & Becker, Inc.

[57] ABSTRACT

A method and apparatus for removing sludge from water, including separating the inorganic constituents or matter in the sludge, such as stones, gravel, etc., from the organic matter, such as wood, roots, etc. In a first stage, those constituents that are larger than a given size are separated out from the sludge, with inorganic and organic ones of these constituents being separated from one another, being cleaned, and being then provided for subsequent use. In a second stage, inorganic constituents that are larger than a minimum size are separated out from the remaining matter, are cleaned, and are then provided for subsequent use. In a third stage, water is removed from the inorganic and organic slurry of the remaining matter to form a thick sludge and effluent.

12 Claims, 1 Drawing Sheet

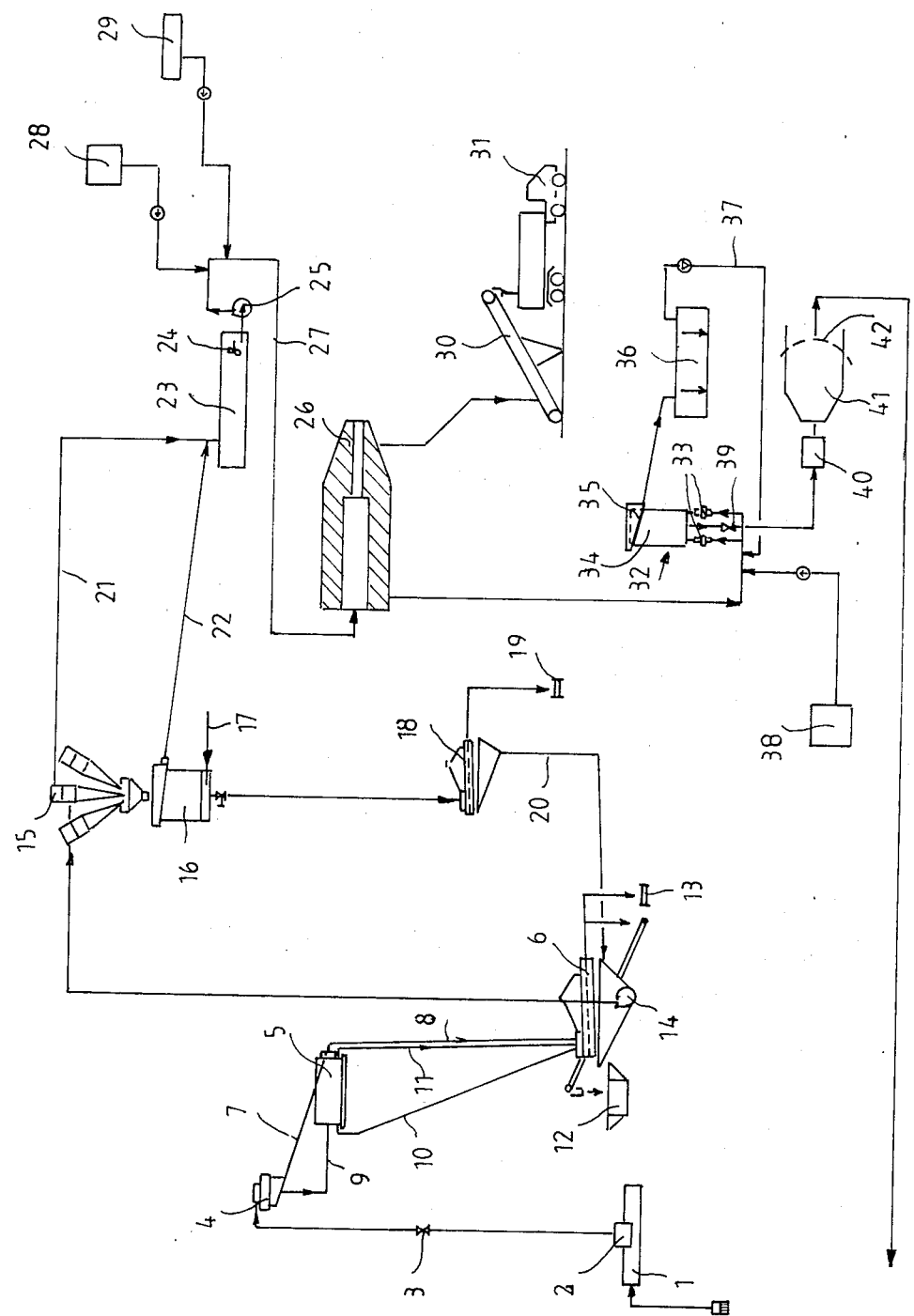

METHOD AND FACILITY FOR REMOVING SLUDGE FROM WATER

BACKGROUND OF THE INVENTION

The present invention relates to a method and facility for removing sludge from water, and includes the steps of separating the inorganic constituents or matter in the sludge, such as stones, gravel, etc., from the organic matter, such as wood, roots, etc. The method and facility are also suitable for processing sediment that contains decaying organisms.

Sludge that is removed from water contains a number of constituents that can be divided approximately into inorganic and organic constituents. The inorganic constituents are primarily stones, gravel, sand, etc., while the organic constituents include wood and roots. The organic constituents also include oils that have been introduced into the water and have contaminated the latter. The sludge furthermore includes chemical contaminants, such as phosphates that have been introduced into the water and have become dissolved therein.

The objective of removing sludge from water is to rid the water of these inorganic and organic constituents. Actually, the greater problem arises as to what to do with this matter after it has been removed from the water. Since dumps are becoming continuously more scarce, a further objective during the removal of sludge from water must be the recovery of inorganic and organic constituents, such as stone, gravel, sand, wood, roots, etc., and the subsequent use of such matter as economically usable material. It should be necessary to place only a fraction of this matter in dumps. However, with the heretofore known methods and facilities, this objective cannot be achieved in a fully satisfactory manner, so that a large portion of sludge removed from water still has to be placed in dumps.

It is therefore an object of the present invention to improve the heretofore known methods and apparatus for removing sludge from water in such a way that small quantities only have to be placed in dumps, and that the rest of the constituents of the sludge can be provided for subsequent use as economically usable material.

BRIEF DESCRIPTION OF THE DRAWING

This object, and other objects and advantages of the present invention, will appear more clearly from the following specification in conjunction with the accompanying schematic drawing, which illustrates one preferred exemplary embodiment of the inventive facility for carrying out the method of the present invention for removing sludge from water.

SUMMARY OF THE INVENTION

The method of the present invention is characterized primarily by three stages. In a first stage, those constituents that are larger than a given size are separated out from the sludge, with inorganic and organic ones of these constituents being separated from another, whereupon these constituents are cleaned and then provided for subsequent use. In a second stage, inorganic constituents that are larger than a minimum size are separated out from the remaining matter, are cleaned, and are provided for subsequent use. Finally, in a third stage, water is removed from the inorganic and organic slurry of the remaining matter to form a thick sludge and effluent, which are withdrawn and/or further processed.

With these method steps, it is possible to obtain a satisfactory separation from one another of the inorganic and organic constituents contained in the sludge. The individual constituents can be provided for further use as economically usable material. In the first stage, the stones and the gravel of the inorganic matter are separated out and can, for example, be supplied to a gravel deposit for subsequent use. At the same time, the organic constituents, i.e., for example, wood or roots, are separated out and are also provided for further use, which can include, for example, combustion for producing energy, or the production of composts. The remaining fine particles are subsequently supplied to the second stage, where the remainder of the inorganic constituents, mainly the sand, are separated off and are supplied, for example, to a sand deposit for subsequent use. Remaining very small inorganic, i.e. mineral, constituents that could not be separated off in the second stage, as well as the fine organic constituents, are finally supplied in a slurry to a third stage where water is removed to form a dense or thick sludge. The latter can then be dumped, used to produced composts, or burned. The effluent can either be returned to the individual stages or to the body of water from which the sludge was originally removed. As a result of these processing stages of the sludge, constituents are recovered therefrom that to a large extent can be subsequently used as economical material without having to place them in a dump.

Pursuant to a further feature of the present invention it is proposed that in a preliminary stage, prior to the first stage, first the water together with the constituents below the given size can be separated off, especially by a screening process, and then being supplied to the first stage, with the constituents above the given size for which the water has been preliminarily removed being separated into inorganic and organic constituents, which are then supplied in this separated form to the first stage. This has the advantage that due to the preliminary stage, it is possible to separate the large constituents from one another even better. The fine particles are first separated off, preferably by a screening process, and are then supplied to the first stage, while the larger constituents, from which the water has been removed, are separated into their inorganic and organic constituents, and are then supplied to the first stage in this separated form. This is particularly advantageous where the wood is to be satisfactorily separated from the mineral constituents, which could lead to difficulties. However, due to the multi-stage nature of the inventive procedure, this problem is eliminated. The water that is separated off during the process in the second stage of separating out the inorganic constituents is preferably returned to the first stage, so that the process of operating the individual stages is simplified.

In a preferred manner of carrying out the present invention, the phosphates dissolved in the water are precipitated out between the second and the third stages, especially with ferric chloride sulfate or ferrous sulfate, with these precipitants being separated out in the third stage along with the thick sludge. This preferred way of carrying out the inventive method confronts the problem that sludge from water is very often polluted with phosphates that are dissolved in the water. When the effluent is returned to the water, it is absolutely necessary to remove these phosphates. Pursuant to the present invention, this is preferably effected between the second and third stages by precipitating out the phosphates dissolved in the water, so that the phosphate precipitants can be separated off in the third stage and can be associated with the thick sludge.

Pursuant to a further preferred embodiment, it is proposed that the water be neutralized between the second and third stages, especially by adding lime solution thereto. This counteracts in particular the problem of the water being too acidic due to the presence of $SO_2$ deposits, which in particular lead to the death of the fauna in the water. The addition of lime solution results in a neutralization of the effluent, so that in the ideal situation the pH value becomes 7. The addition of lime solution also results in a precipitation, whereby the precipitant can then be supplied to the thick sludge in the third stage.

In another preferred embodiment, it is further proposed that, after the third stage, oil that is possibly present be separated off from the effluent and subsequently used, with the remaining effluent being returned to the body of water or to previous stages. To separate the oil from the effluent, the latter is preferably treated with air or oxygen. Air or oxygen particles (bubbles) attach to the oil droplets, so that the thus-formed oil/air particles float due to buoyancy and can be withdrawn. This inventive procedure assures that the effluent can be rid of possible oil residues, so that the effluent can be readily returned to the body of water, with this effluent often having a better quality than the water in the body of water itself. This makes it unnecessary to convey the effluent to clarification plants that are very seldom present in the vicinity of lakes or rivers. The separated oil itself can be supplied for subsequent use, for example for the regeneration of waste oil. In addition to providing oil-free effluent, the pneumatic flotation can reduce the chemical oxygen demand (C.O.D.) as well as the biochemical oxygen demand (B.O.B.), with the C.O.D. values being capable of being improved between 20 and 50%.

Prior to the pneumatic flotation, the effluent is preferably treated with demulsifying chemicals to produce an oil sludge, so that the pneumatic flotation for separating the oil operates optimally, and hence the greatest portion of the oil can be separated out of the effluent.

It is finally proposed that the suspended and floating particles be removed from the effluent, especially by being filtered out. This considerably reduces the chemical oxygen demand (C.O.D.).

The inventive facility for carrying out the method of the present invention has a sludgewithdrawal apparatus as well as apparatus for separating inorganic and organic constituents from one another, and is inventively characterized by: a sorter, disposed downstream of the sludge-removal apparatus, for separating out constituents above a given size, and separating inorganic and organic ones of these constituents from one another; a cyclone unit, disposed downstream of the sorter, for separating out from the remaining matter organic constituents above a minimum size; and a centrifuge, disposed downstream of the cyclone unit, for removing water from the inorganic and organic slurry of the remaining matter to form a thick sludge. Thus, the inventive facility for carrying out the method of the present invention comprises a total of three successively arranged apparatus, namely a sorter, a cyclone unit, and a centrifuge. With the sorter, the large constituents are separated from the fine constituents and are discharged for subsequent use. The fine constituents are then supplied to the cyclone unit, where the sand is separated off and is also supplied for subsequent use, for example by being supplied to a sand deposit. The remaining fine organic constituents and fine mineral constituents that could not be separated off in the cyclone unit are subsequently supplied to the centrifuge, where water is removed to form thick sludge, which can then be withdrawn.

In a preferred embodiment of the inventive facility, it is proposed that the sorter be a vibratory classifier or sorter that has many runs, with a screen cyclone and a subsequently disposed washing drum being disposed upstream of the sorter. The screen cyclone has a top run and a bottom run, with the top run leading directly to a run of the sorter. Preliminarily separated water having constituents below a certain size is delivered to this top run in the screen cyclone. The bottom run leads to the washing drum, with those constituents that are above the certain size and from which water has been preliminarily removed being delivered to this bottom run. The inorganic and organic constituents are separated from one another in the washing drum, and are supplied to respective runs of the vibratory sorter. As a result of the combination of the screen cyclone, the washing drum, and the vibratory sorter, it is possible to achieve an optimum separating out of the large constituents, separated into inorganic and organic constituents. A preliminary separating-out of water, with a preliminary screening of constituents below a certain size, is first undertaken in the screen cyclone, with this water being supplied directly via a top run to the vibratory sorter, which for this purpose is provided with several runs. In contrast, the large constituents from which water was removed in the screen cyclone are supplied via a bottom run to the washing drum, which is provided with baffle plates that make it possible to separate the large inorganic constituents from the large organic constituents. These separated constituents are subsequently supplied from the washing drum to separate runs of the vibratory sorter, in which a further sorting of the constituents is undertaken. These constituents are conveyed several times by the sorter, with fine organic and mineral particles being separated from the large constituents. The combination of screen cyclone, washing drum, and vibratory sorter has the particular advantage that the large inorganic and organic constituents can be satisfactorily separated from one another. This is possible only with great difficulty using a vibratory sorter alone, since it is not possible to use dynamic sorting for separating off wood that has been completely saturated with water and therefore has no buoyancy.

Preferably disposed between the cyclone unit and the centrifuge is a precipitation station for precipitating the phosphates dissolved in the water, especially by using ferric chloride sulfate and ferrous sulfate. As a result of this precipitation station, it is possible to remove the phosphates dissolved in the water in a simple manner. Also preferably disposed between the cyclone unit and the centrifuge is a neutralization station for neutralizing the water, especially by using a lime solution. As a result of this neutralization station, the water is deacidified or neutralized, for example by the addition of lime solution, so that the water can be readily returned to the body of water from which the sludge was taken, possibly even in a better condition than the body of water itself. Both in the case of precipitation of the phosphates and in the addition of lime solution, the precipitant is separated off in the subsequent centrifuge and is carried off with the thick sludge.

Pursuant to a further preferred embodiment of the inventive facility, it is proposed that a pneumatic flotation cell that has gas-introduction reactors and a separating tank with an overflow be disposed after the centrifuge for separating off oil from the effluent. As a result of the pneumatic flotation cell, it is additionally possible to separate off oil, with this being accomplished in a technically very straightforward manner in the pneumatic flotation cell, which via its gas-introduction reactors attaches air or oxygen to the oil particles, so that the oil/air particles float in the separating tank due to their buoyancy, and can then be withdrawn via the overflow, so that the oil sludge concentrate can be supplied for subsequent use, for example in a waste-oil regeneration plant.

It is finally proposed that a filter, especially a sand filter or a solid-body filter, be disposed after the centrifuge, with this filter removing the suspended and floating particles from the effluent. In this way, the chemical oxygen demand (C.O.D.) is considerably reduced.

Further specific features of the present invention will be described in detail subsequently.

DESCRIPTION OF PREFERRED EMBODIMENTS

Referring now to the drawing in detail, the illustrated facility includes a sludge-withdrawal apparatus 1, for example in the form of a cutting head suction dredger. This withdrawal apparatus 1 is equipped with a stone-collecting basket 2 that has, for example, a mesh or screen aperture of 100 mm, and hence traps matter that is greater than 100 mm.

Via the interposition of a volume regulator 3 for supplying the facility, the sediment suspension is supplied to a first separation stage, which comprises a screen cyclone 4, a washing drum 5, and a vibratory classifier or sorter 6. A separation of larger inorganic and organic matter above a given size, for example 6 mm, from finer matter, for example below 6 mm, takes place in this first separation stage. A preliminary water separation and a preliminary screening of the larger matter above 6 mm takes place in the screen cyclone 4, so that the preliminarily separated-off water with finer matter below 6 mm is withdrawn via a top run 7 and is supplied via a line 8 to the vibratory sorter 6. The solid suspension from which water has been removed in the screen cyclone 4, and which contains the larger matter, is supplied via a bottom run 9 to the washing drum 5, which is provided with baffle plates. The latter effect a separation of the larger organic matter (wood, roots, etc.) from the larger inorganic matter (stones, gravel, sand, etc.), with the discharge from the washing drum 5 being effected separately via the line 10 (for organic matter) and the line 11 (for inorganic matter). A further, notindicated line leads from the washing drum 5 to the vibratory sorter 6, with this line conveying finer matter under 6 mm from the washing drum 5 to the sorter 6.

The vibratory sorter 6 comprises four runs, namely a first run for the preliminarily separatedoff water and the preliminarily screened-off matter from the top run 7 and the subsequent line 8, a second run for the inorganic matter from the washing drum 5 via the line 11, a third run for the organic matter that also comes from the washing drum 5 via the line 10, and a fourth run for the fine matter below 6 mm from the washing drum 5 via the non-indicated line. The first and fourth runs with the fine matter below 6 mm can also be combined.

The larger matter is carried back and forth several times on the runs of the vibratory sorter 6 and is separated from fine organic and mineral particles. This is particularly applicable for the large organic matter to wash therefrom fine particles that might be contaminated with heavy metals. The thus cleaned organic matter is supplied from the appropriate run of the vibratory sorter 6 to a container 12, from where the wood and the roots are supplied for combustion, for example for producing energy, or are supplied for the production of composts. The large inorganic matter is similarly supplied, after being cleaned, to a gravel deposit 13 that contains stones larger than 6 mm. Just like the wood and the roots, the gravel from the deposit 13 can also be supplied for subsequent use.

Via a feed pump 14, the fine inorganic and organic matter of a size below 6 mm is supplied in suspension to a (multi-) cyclone unit 15. Separation of sand having a size between a minimum of 0.063 and 6 mm takes place in the cyclone unit 15. Disposed downstream of the cyclone unit 15 is a heavy-medium sorter 16 that has an inlet 17 for fresh water or water from a water main, with this water conveying the cleaned sand via a vibratory water remover 18 to a sand deposit 19. The filtrate water from the vibratory water remover 18 is returned to the vibratory sorter 6 via a line 20.

The fine mineral constituents below 0.063 mm that cannot be separated out in the cyclone unit 15, as well as the fine organic constituents, are conveyed via a line 21 (for mineral slurry) and a line 22 (for organic slurry) to a collecting tank 23 that is provided with a homogenizer 24. From there the slurry is conveyed further via a feed pump 25 to a centrifuge 26, which forms the third separation stage after the cyclone unit 15, which forms the second separation stage.

Disposed in the line 27 between the collecting tank 23 and the centrifuge 26 is a precipitation station 28 which, by adding ferrous sulfate or ferric chloride sulfate, precipitates the phosphates dissolved in the water and converts them into solids that can settle out.

Also disposed in the line 27 between the collecting tank 23 and the centrifuge 26 is a neutralization station 29 which, by the addition of, for example, a lime solution, deacidifies and hence neutralizes the water, and at the same time aids in sedimentation. Here also a solid is precipitated that can settle out.

A removal of water from the mineral and organic slurries, as well as from the precipitants from the stations 28 and 29, is effected in the centrifuge 26. The dense or thick sludge thus obtained is delivered to a truck 31, for example via a conveyer belt 30, whereupon the sludge can be taken to a dump, used to produce composts, burn, etc.

The effluent from the centrifuge 26 is finally conveyed to a pneumatic flotation cell 32 that comprises two gas-introduction reactors 33 that are operated, for example, by a compressor. The pneumatic flotation cell 32 furthermore comprises a separating tank 34 that has an overflow 35.

The pneumatic flotation cell 32 serves to separate off any oil that might be contained in the effluent. For this purpose, the effluent that is contaminated with oil is sent through the two gasintroduction reactors 33, in which a fine bubbled gas dispersion takes place, whereby uniform gas bubbles pass through the effluent as completely as possible. In so doing, a cross current of gas acts upon the oil/water system that enters the gas-introduction reactors 33, with high gas and water velocities being necessary in the reactors 33 for the attachment kinetics. Due to the existing physical conditions (micro turbulences and air bubbles in "status nascendi", together with the forced combination of the oil particles with the gas bubbles), a very high adhesion of the waterrepellant oil particles to the gas phase is achieved during the very short retention time in the gas-introduction reactors 33. The formation of gas bubbles can be effected by a porous tubular wall having very uniform apertures of small diameter. The actual oil separation then takes place downstream in the cylindrical separating tank 34, with the oil/air particles, due to their low density, being driven upwardly to the surface. The oil-rich phase is carried off via the overflow 35, and the concentrate of the oil sludge is carried off and collected in a container 36. From there, the oil sludge can be supplied, for example, to a waste-oil regeneration plant. The separated-off emulsion water from the container 36 is returned to the pneumatic flotation cell 32 via the line 37.

In order to improve the oil separation, oil demulsifying chemicals for producing an oil sludge are added to the effluent from the centrifuge 26 via an additive station 38; these chemicals are preferably surface active agents.

The oil-purged effluent from the pneumatic flotation cell 32, after passing a fillingcondition regulator 39 and a filter 40, is introduced into a trench 41 of a main channel, which trench can be provided with an oil barrier 42. From there, the effluent is returned to the body of water from which the sludge was originally withdrawn. The filter 40 is intended to rid the effluent of suspended particles and floating material. The filter 40 can, for example, be a sand filter or a solid-body filter. This considerably reduces the chemical oxygen demand (C.O.D).

The facility just described can be fixedly constructed. However, it is also possible to make the facility mobile; in other words, the facility can be transported to wherever it is needed. In such a case, the facility is a single compact apparatus that contains all of the components.

The present invention is, of course, in no way restricted to the specific disclosure of the specification and drawing, but also encompasses any modifications within the scope of the appended claims.

What is claimed is:

1. A method of removing sludge from a body of water, which sludge contains water, inorganic constituents, and organic constituents with which a problem arises as to what to do with this matter of constituents after removal thereof from the water since dumps are becoming more scarce so that this problem is met in such a way that only small quantities have to be placed in dumps and that the rest of the constituents of the sludge can be provided for subsequent use as economically usable material, including steps of separating the inorganic constituents in the sludge, comprising stones and gravel, from the organic constituents thereof, comprising wood and roots, said method comprising: minimizing the volume of said sludge to be disposed in said dumps by effecting in sequence the steps of:

recovering said inorganic constituents for economic use by providing a sorter in a first stage and separating out from said sludge those constituents that are larger than a given size, with inorganic and organic ones of these larger constituents being separated from one another cleaning these larger constituents, and providing them for subsequent further use as economically usable material to avoid the problem of placement thereof in dumps;

recovering said organic constituents by providing a cyclone unit in a second stage and separating out from the remaining matter inorganic constituents that are larger than a minimum size, cleaning these constituents, and providing them for subsequent further use also as economically usable material to avoid the problem of placement thereof in dumps;

providing a centrifuge in a third stage and removing water from the inorganic and organic slurry of remaining matter to form a thick sludge and effluent; and depositing said thick sludge in at least one of said dumps.

2. A method according to claim 1, which includes the steps of, in a preliminary stage, prior to said first stage: carrying out a screening process to separate off water together with those constituents that are below said given size; supplying this separated-off water and smaller constituents to said first stage; separating those constituents that are above said given size, and from which water has been preliminarily removed, into inorganic and organic constituents; and supplying these larger constituents, in this separated state, to said first stage.

3. A method according to claim 1, which includes the step of returning water that is separated off in said second stage to said first stage.

4. A method according to claim 1, which includes the steps, between said second and third stages, of precipitating out, as precipitants, phosphates that are dissolved in the water, and supplying these precipitants to said third stage for separation out with said thick sludge.

5. A method according to claim 4, which includes, for effecting said precipitating out, using one of the compounds selected from the group consisting of ferric chloride sulfate and ferrous sulfate.

6. A method according to claim 1, which includes the step of neutralizing the water between said second and third stages.

7. A method according to claim 6, which includes the step of effecting said neutralization by adding lime solution to said water.

8. A method according to claim 1, which includes the steps, after said third stage, of separating off from said effluent oil that might be present, supplying said oil for subsequent use, and returning the remaining effluent to said body of water or to a previous stage.

9. A method according to claim 8, which, to effect said separating off of oil from said effluent, includes the steps of treating said effluent with a gas selected from the group consisting of air and oxygen, whereby gas bubbles become attached to droplets of oil to form oil/gas particles that float due to their buoyancy, and withdrawing said floating oil/gas particles.

10. A method according to claim 8, which, prior to said step of separating off oil, includes the step of treating said effluent with demulsifying chemicals to produce an oil sludge.

11. A method according to claim 1, which includes the step of removing suspended and floating particles from said effluent.

12. A method according to claim 11, which includes the step of using a filter to effect said removal.

* * * * *